No. 12,187. REISSUED DEC. 29, 1903.

W. LEPPERT.

WAGON BODY.

APPLICATION FILED NOV. 10, 1902.

4 SHEETS—SHEET 1.

Witnesses
Evert L. Palmer.
Geo. A. Hutchinson

Inventor
William Leppert.
by Edson Bros,
Attorneys

THE NORRIS PETERS CO., PHOTO-LITHO., WASHINGTON, D. C.

No. 12,187. REISSUED DEC. 29, 1903.

W. LEPPERT.

WAGON BODY.

APPLICATION FILED NOV. 10, 1902.

4 SHEETS—SHEET 2.

Witnesses
Everett C. Palmer.
Geo. L. Hutchinson

Inventor
William Leppert.
by Edson Bros.
Attorneys

THE NORRIS PETERS CO., PHOTO-LITHO., WASHINGTON, D. C.

No. 12,187. REISSUED DEC. 29, 1903.

W. LEPPERT.

WAGON BODY.

APPLICATION FILED NOV. 10, 1902.

4 SHEETS—SHEET 3.

Witnesses
Ezra C. Palmer.
Geo. A. Hutchinson.

Inventor
William Leppert.
by Edson Bros.
Attorneys

THE NORRIS PETERS CO., PHOTO-LITHO., WASHINGTON, D. C.

No. 12,187. REISSUED DEC. 29, 1903.

W. LEPPERT.

WAGON BODY.

APPLICATION FILED NOV. 10, 1902.

4 SHEETS—SHEET 4.

Witnesses
Evert C. Palmer.
Geo. E. Hutchinson

Inventor
William Leppert.
By Edson Bros.
Attorneys

THE NORRIS PETERS CO., PHOTO-LITHO., WASHINGTON, D. C.

No. 12,187. Reissued December 29, 1903.

UNITED STATES PATENT OFFICE.

WILLIAM LEPPERT, OF TIPPECANOE CITY, OHIO.

WAGON-BODY.

SPECIFICATION forming part of Reissued Letters Patent No. 12,187, dated December 29, 1903.

Original No. 690,306, dated December 31, 1901. Application for reissue filed November 10, 1902. Serial No. 130,819.

*To all whom it may concern:*

Be it known that I, WILLIAM LEPPERT, a citizen of the United States, residing at Tippecanoe City, in the county of Miami and State of Ohio, have invented certain new and useful Improvements in Wagon-Bodies; and I do hereby declare the following to be a full, clear, and exact description of the invention, such as will enable others skilled in the art to which it appertains to make and use the same.

My invention relates to improvements in wagon-bodies particularly adapted for market-wagons, ambulances, &c.

The invention has for its object to provide a sliding top or cover for a wagon which will provide a shelter, canopy, or awning in rear of the body.

At the date of my invention no wagon having a sliding top or cover to serve as a shelter, cover, or canopy in rear of the body had been used to my knowledge, although there were in existence wagons in which the body was extensible or the top was adapted to be extended or projected out in rear of the body by manually changing the locations of its supports.

My invention broadly consists of a wagon-body having an independent or supplemental sliding top or roof.

It also consists of awnings connected to said sliding top adapted to be raised or extended to provide a shelter or canopy of greater area.

It further consists of the details of construction, arrangement, and combination of parts, as hereinafter described, and particularly pointed out in the claims.

Figure 1:
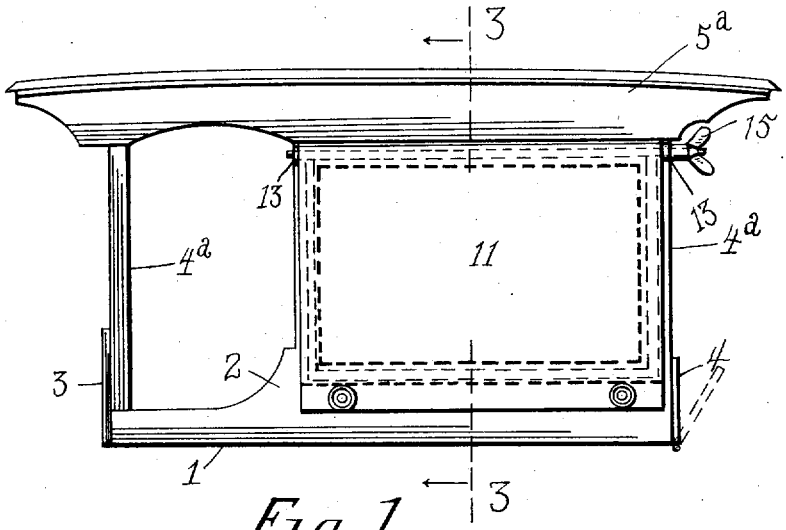
Figure 2:
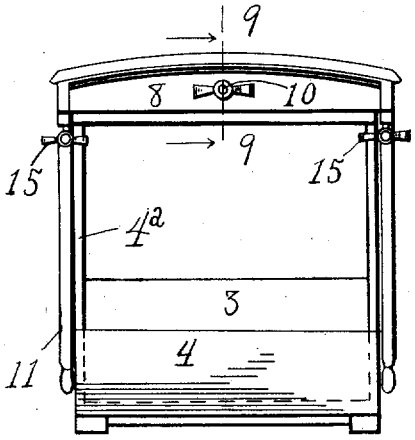
Figure 3:
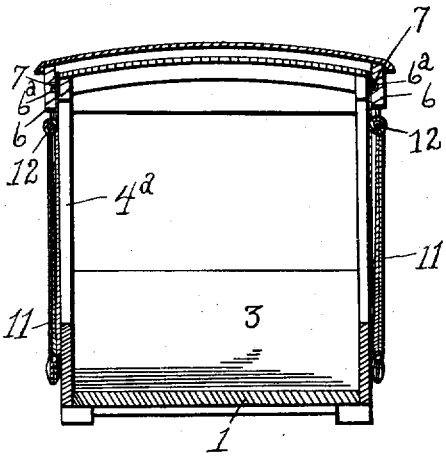
Figure 4:
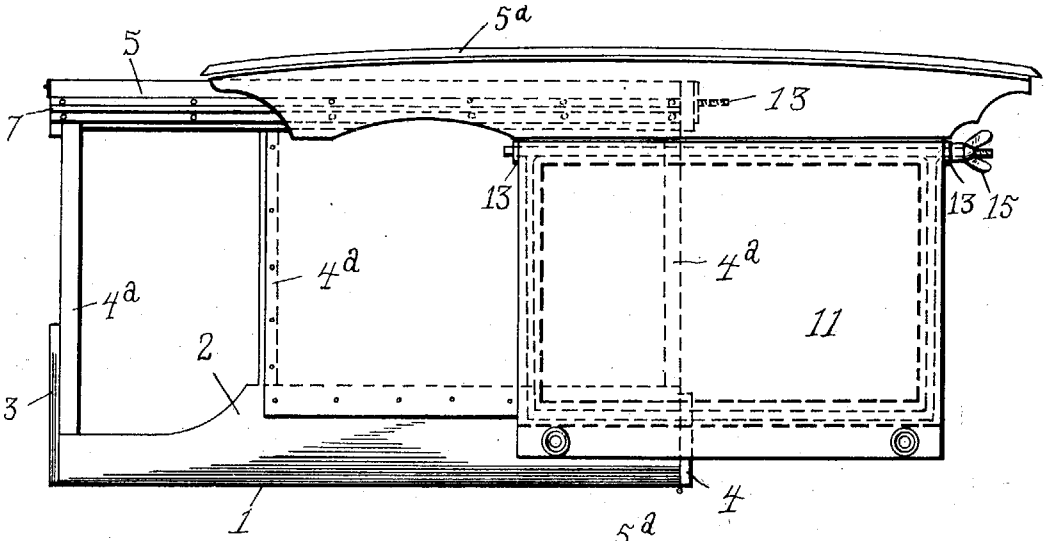
Figure 5:
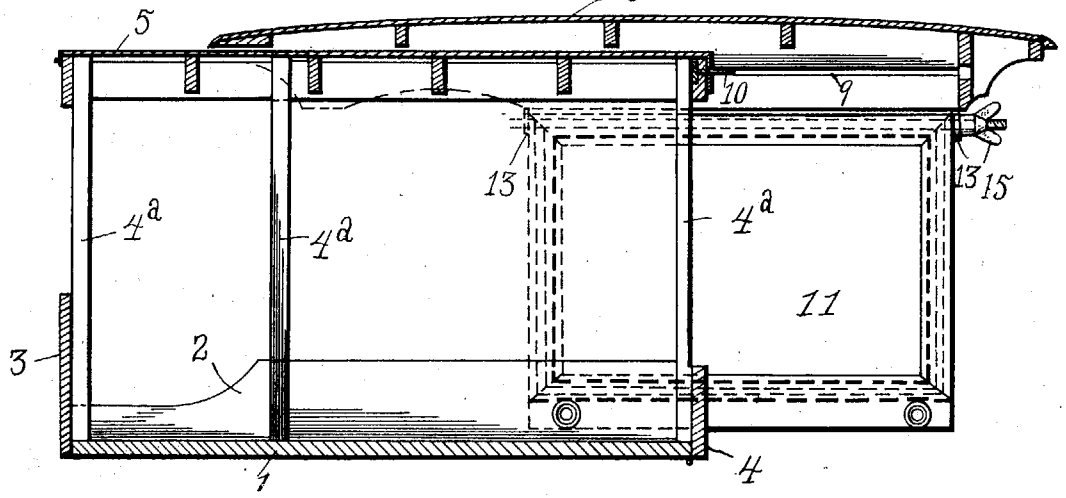
Figure 6:
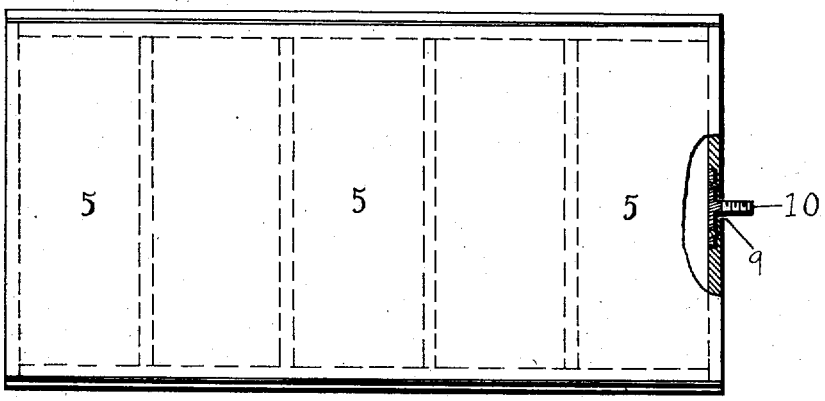
Figure 7:
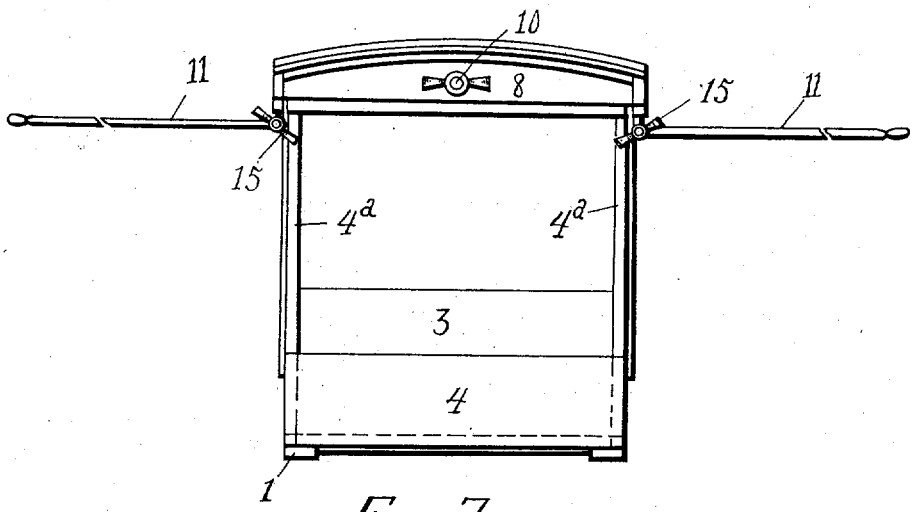
Figure 8:
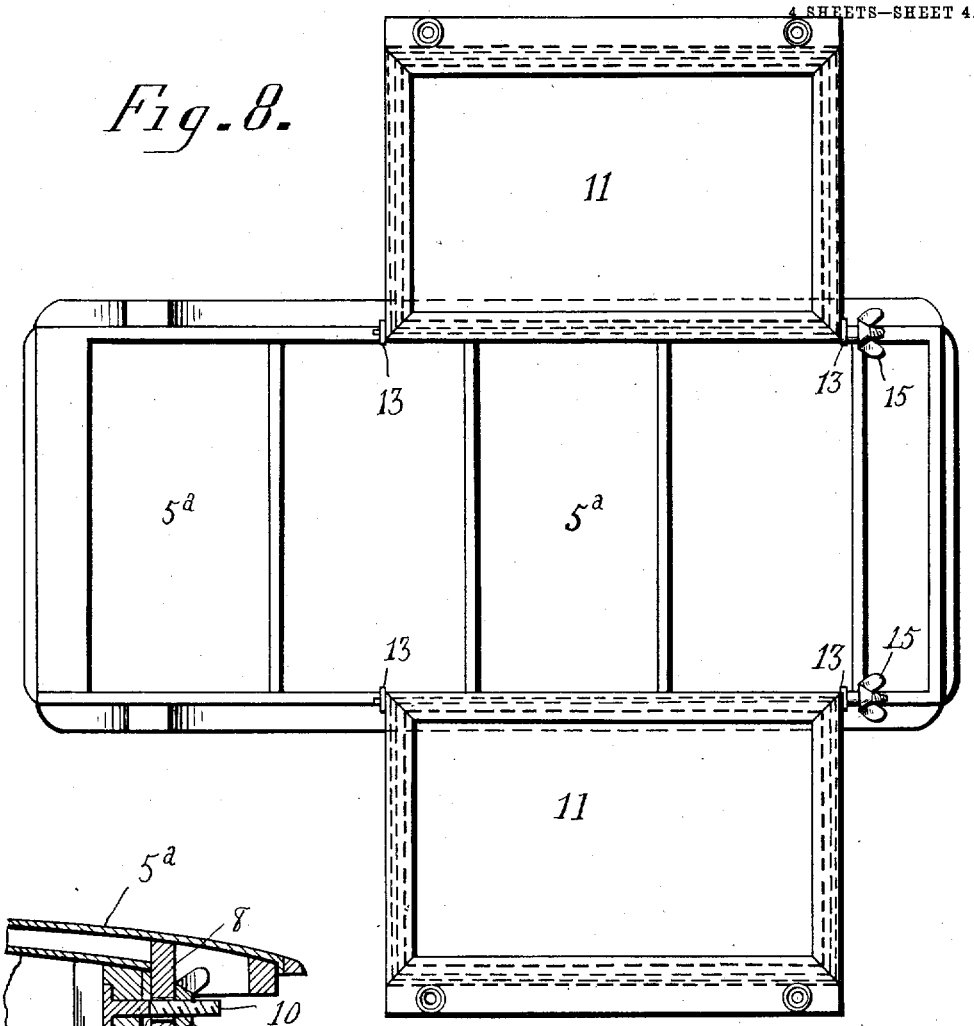
Figure 9:
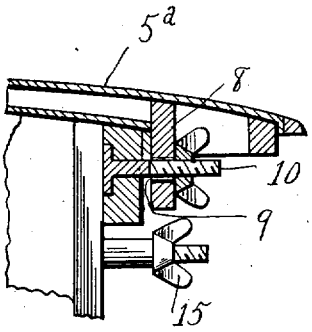
Figure 10:
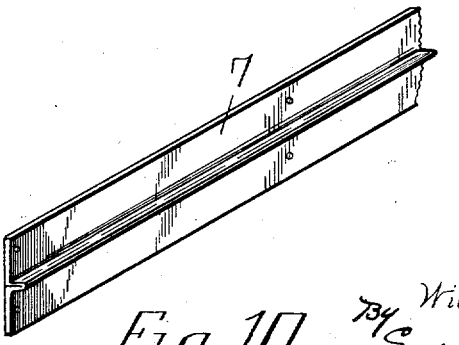

In the accompanying drawings, illustrating the embodiment of my invention, and in which like reference characters designate similar and corresponding parts, Figure 1 is an elevation of my invention, showing the parts arranged for traveling. Fig. 2 is an end view thereof. Fig. 3 is a section on the line 3 3 of Fig. 1 looking in the direction of the arrow. Fig. 4 is an elevation showing the supplemental sliding top or roof partly extended. Fig. 5 is a vertical longitudinal section with the parts arranged as in Fig. 4. Fig. 6 is a plan view of the wagon-body with the supplemental sliding top removed. Fig. 7 is an end elevation of the device with the awnings raised. Fig. 8 is a plan of the supplemental sliding top, viewing it from the bottom. Fig. 9 is a sectional view on the line 9 9 of Fig. 2, showing the means for locking the supplemental sliding and fixed tops together when the former is not extended; and Fig. 10 is a perspective view of one of the ribbed guide-plates secured to the fixed top or cover section.

Referring more particularly to the drawings, in the wagon-body 1 designates the bottom; 2, the sides; 3, the dashboard, and 4 the gate or tail-board. Above said body is supported by posts or standards $4^a$ a fixed top or cover 5, upon which is superposed a supplemental sliding top or cover $5^a$. Secured above the longitudinal edges of the supplemental sliding top or cover $5^a$ are depending guides or flanges 6, which embrace the edges of said fixed top or cover and are provided with grooves or channels $6^a$, within which slide corresponding ribs 7, secured along the edges of said fixed top for holding said sections together. Said flanges are connected near the rear end thereof by a brace 8, provided with an aperture 9 to receive a bolt 10, secured to the fixed section. Said bolt is adapted to project through the aperture, so as to have a nut applied thereto for locking the sections when they are folded. To the supplemental sliding top or cover are pivoted awnings 11, adapted to be extended or to project at the sides to provide an additional shelter or covering. These awnings are secured to a rod 12, having its ends bearing in brackets 13, secured to the supplemental sliding top or cover. Said awnings when raised may be held at any desired position by clamping the brackets 13 upon the edges thereof. This is effected by securing one end of the supporting-rod 12 to one of the brackets and having the opposite end of said rod projecting through the other bracket and screw-threaded, upon which is screwed a nut 15, which when turned is adapted to draw said brackets toward each other in order to clamp the edges of the awning.

It is obvious that my invention provides a device particularly adapted for marketers and other street venders who usually display their goods or merchandise, &c., upon boxes and barrels placed upon the street in the rear of the wagon. My top or shelter covers the space in rear of the wagon, and thus will protect the vender from rain or sun, &c., which have heretofore resulted in both great inconvenience to the vender or tradesman and damages to his goods or merchandise. Further, the awnings may be so adjusted as to shut off the wind, which is sometimes the source of discomfort to the vender and often destroys or scatters his articles of commerce. My invention is also particularly adapted for use with ambulances or other vehicles in which it is desirable to have a shelter or cover extending in rear of the wagon-body.

Having thus described my invention, what I claim as new, and desire to secure by Letters Patent, is—

1. The combination with a wagon-body provided at its sides with longitudinal guides, of an adjustable top having grooves to receive said guides, awning-frames pivotally secured to the sides of the top, a screw projecting from the rear cross-bar of the body and passing through an opening in the rear cross-bar of the top, and a nut for securing the top upon the body.

2. The combination with a wagon-body, provided at its sides with longitudinal guides, of an adjustable top formed with grooves to receive said guides, bearings depending from the sides of the top, awning-frames having projections supported within said bearings, and means for clamping said frames at any position to which they may be adjusted.

3. The combination with a wagon-body, of metallic strips bent to form longitudinal ribs and secured to the outer surfaces of the upper side bars of the body, an adjustable top having parallel grooves to receive said ribs, means for securing the cover on the body comprising a screw and nut; awning-frames pivotally secured to the sides of the top; and means for clamping said frames in any position to which they may be adjusted.

4. The combination with a wagon-body of a supplemental sliding top, and an awning flexibly secured to said supplemental top at its side edges, said awning being adapted to be folded against the sides of the wagon-body when the supplemental top is in coincidence with the wagon-body, and to be raised to any desired position when said supplemental top is made to project beyond the end of the wagon-body.

In testimony whereof I affix my signature in the presence of two witnesses.

WILLIAM LEPPERT.

Witnesses:
J. A. KERR,
R. A. KERR.